F. E. CARLSON.
AUTOMOBILE TIRE PUMP.
APPLICATION FILED OCT. 24, 1910.
1,005,690.
Patented Oct. 10, 1911.
2 SHEETS—SHEET 1.
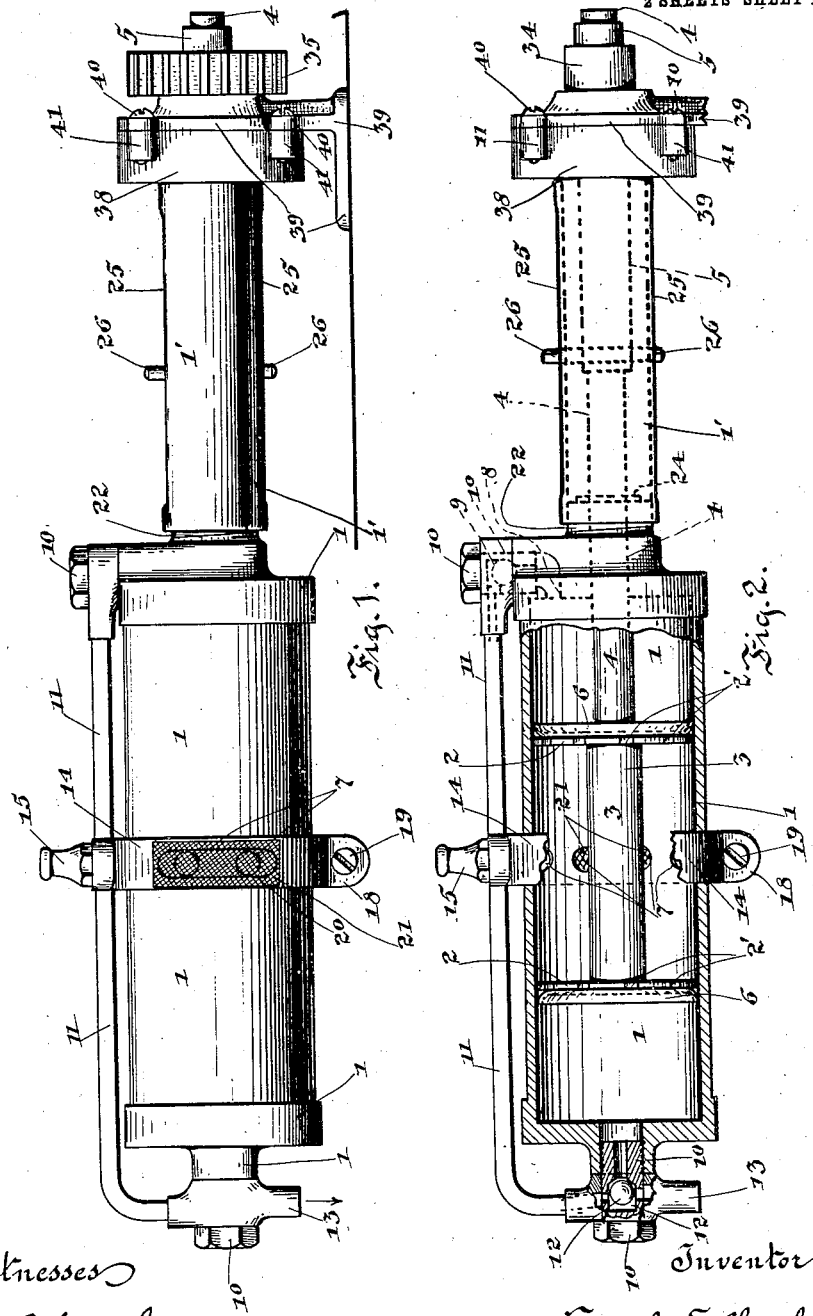
Witnesses
W. C. Smith
B. G. Richards
Inventor
Frank E. Carlson
by Joshua R. H. Potts
his Attorney.

F. E. CARLSON.
AUTOMOBILE TIRE PUMP.
APPLICATION FILED OCT. 24, 1910.

1,005,690.

Patented Oct. 10, 1911.
2 SHEETS—SHEET 2.

Witnesses
W. C. Smith
B. G. Richards

Inventor
Frank E. Carlson
by Joshua R. H. Potts
his Attorney

UNITED STATES PATENT OFFICE.

FRANK E. CARLSON, OF CHICAGO, ILLINOIS.

AUTOMOBILE TIRE-PUMP.

1,005,690.  Specification of Letters Patent.  Patented Oct. 10, 1911.

Application filed October 24, 1910. Serial No. 588,711.

*To all whom it may concern:*

Be it known that I, FRANK E. CARLSON, a citizen of the United States, and a resident of the city of Chicago, county of Cook, and State of Illinois, have invented certain new and useful Improvements in Automobile Tire-Pumps, of which the following is a specification.

My invention relates to improvements in automobile tire pumps of the class which are adapted to be driven by a rotative element of the automobile motor.

The object of my invention is to provide a tire pump which shall be simple of construction, strong and durable, and efficient in operation.

My invention consists in the novel construction and arrangements of parts as will be hereinafter fully described and more particularly pointed out in the appended claims.

My invention will be best understood by reference to the accompanying drawings forming a part of this specification, and in which—

Figure 3:
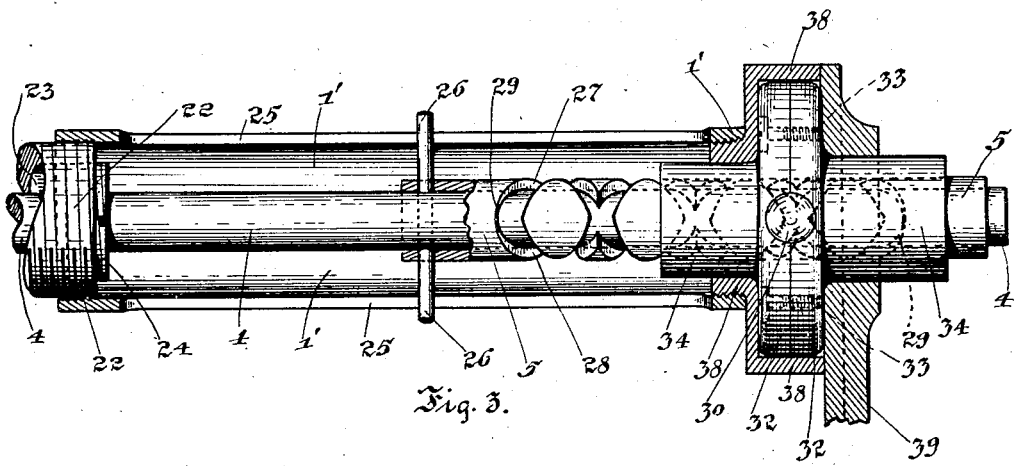
Figures 5, 6:
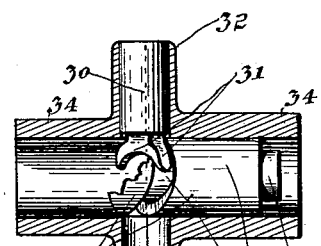
Figure 4:
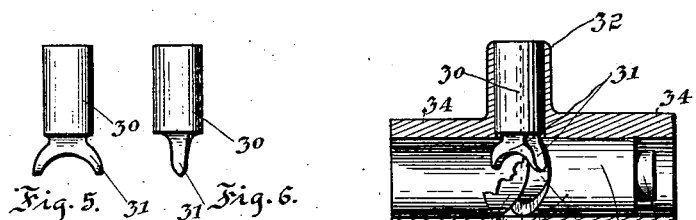
Figures 7, 8:
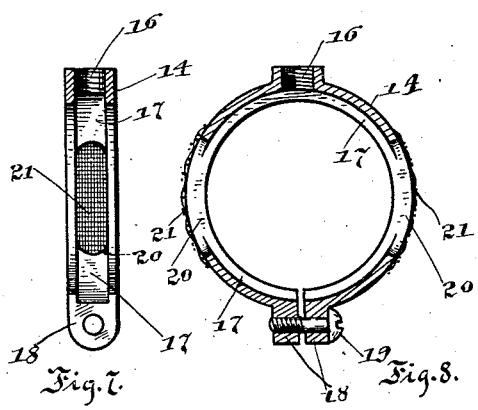

Figure 1 is a side elevation of my improved tire pump in its preferred form, Fig. 2 is a sectional elevation thereof, Fig. 3 is a longitudinal section showing the means for reciprocating the pump pistons, Fig. 4 is a detail longitudinal section, Figs. 5 and 6 are detail elevations, Fig. 7 is a detail longitudinal section, and Fig. 8 is a detail transverse section.

The preferred construction for carrying my invention into effect as illustrated in the accompanying drawings comprises a cylinder 1 and a tubular casing 1' connected thereto, the latter inclosing a portion of the piston-rod mechanism. Pistons 2 are provided in each end of the cylinder 1 and the same have a series of peripheral notches 2' to permit of the free flow of air into the compression space of the cylinders. The pistons 2 are spaced apart and held in permanent relation to each other by means of a rod 3. The rigid connection thus formed between the pistons 2 cause the same to move synchronously, it being apparent that when one piston is performing its working stroke that the other is admitting air to its respective portion of the cylinder. A piston-rod 4 is arranged in axial alinement with the pistons 2 and rod 3 and extends into the space inclosed by the casing 1'. Piston-rod 4 is surrounded by a sleeve 5 the purpose of which will be described hereinafter. Each piston 2 is provided with an ordinary cup shaped flexible leather packing 6, which fits the cylinder wall closely during the working stroke of the piston but is forced slightly therefrom by the inrush of air during the admission stroke, the air flowing freely through the peripheral notches 2' as hereinbefore stated. Arranged centrally in the cylinder wall is a series of air intake openings 7, the pistons 2 being adapted to register with said openings when at the limit of their out-strokes.

When air is compressed in the right end of the cylinder 1 as illustrated in Fig. 2, the same flows through the passage 8 past the ball check valve 9 formed in the plug 10, and thence through the pipe 11 and past the ball check valve 12 to the delivery nozzle 13 to which is attached a suitable hose, not shown. Surrounding the intake ports 7 is a ring 14 carrying an oil cup 15 which is screwed into the threaded boss 16 as clearly illustrated in Fig. 8. The ring 14 is provided with an internal circular groove 17 and with a pair of depending lugs 18. Said ring is clamped to the cylinder 1 by means of a screw 19 passing through the lugs 18 as shown in Fig. 8. From this construction it is clear that oil entering through the oil cup 15 will flow downwardly over the sides of the cylinder and be drawn thereinto through the ports 7 by means of the suction of the pistons.

In order that air entering the cylinder 1 through the ports 7 may be freed of dust or other foreign particles arcuate slots 20 are provided in the ring 14 and covered by strips of wire gauze 21 as clearly illustrated in the several views.

In order to prevent leakage of air past the piston-rod 4 a stuffing box is provided comprising a threaded boss 22'. The opening 23 of the stuffing box is provided with a plug or cap 24 as illustrated in Fig. 3. The tubular casing 1' is provided with diametrically opposite longitudinal slots 25 in which a diametric pin 26 is adapted to reciprocate. Said pin is passed through the sleeve 5 and piston-rod 4 and is adapted to prevent these parts from rotating during the reciprocation thereof. The sleeve 5 is provided with reversely-disposed helical grooves 28 which terminate in common circular paths 29 as illustrated in Figs. 3 and 4. Traversing said grooves and paths is an oscillatory dog 30 having bifurcated ends 31 as shown in detail in Figs. 5 and 6. The dog 30 is mounted in a two-part rotatable casing 32, the parts of which are secured together by means of screws 33 as indicated by dotted lines in Fig. 3. The casing 32 is provided with longitudinal extensions 34 which are rotatably mounted on the sleeve 5. The casing 32 is driven by a spur gear 35 which is pressed thereon or secured thereto in any desirable manner. An oil well 36 is provided in the casing 32 diametrically opposite the dog 30, said oil well being provided with an oil hole 37 for the introduction of oil. By this means the operative mechanism is lubricated. A housing 38 inclosing the casing 32 is screwed into one end of the casing 1' as clearly illustrated in Fig. 3. The housing 38 is supported by a casting 39 which is connected thereto by means of screws 40, the latter entering lugs 41 as clearly shown in Fig. 1.

The operation of the piston-rod actuating mechanism is as follows:—The casing 38 carrying the oscillatory dog 30 is adapted to have a uniform rotation by means of the gear mounted thereon. Since the bifurcated ends of the dog 30 project into the helical grooves 27 and 28 the piston-rod 4 must reciprocate, said bifurcated ends assuming one angle when said piston-rod is moving in one direction and another angle when said piston rod is moving in the opposite direction. On reaching the end of a helical groove the bifurcated ends are turned to the opposite angle by the influence of the curved path 29, this movement being shown in Fig. 4.

A tire pump of the construction set forth is simple of construction and efficient in operation.

While I have shown what I deem to be the preferable form of my improved tire pump I do not wish to be limited thereto as there might be various changes made in the arrangements of parts described and details of construction without departing from the spirit of the invention as comprehended within the scope of the appended claims.

Having described my invention what I claim as new and desire to secure by Letters Patent is:

1. A tire pump comprising an air cylinder having an intake opening in its central portion, spaced pistons operating in said cylinder at each side of said opening, a ring surrounding said cylinder over said opening, said ring being grooved on its inner side and provided with an intake opening leading to said groove, and a wire gauze covering for the opening in said ring, substantially as described.

2. A tire pump comprising an air cylinder, spaced pistons provided in said cylinder and adapted to move in synchronism therein, a series of intake ports arranged centrally in said cylinder, peripheral notches and flexible packing means provided on said pistons, means for delivering air and preventing the return flow of the same to said cylinder, means for reciprocating said pistons, a ring secured to said cylinder over said ports and provided with an internal circular groove, openings in said ring leading to said groove, and wire gauze coverings for said openings, substantially as described.

3. A tire pump comprising a cylinder, spaced pistons in said cylinder adapted to move in synchronism, a series of spaced intake ports arranged in said cylinder, peripheral notches and flexible packing means provided on said pistons, means for delivering air and preventing the return flow of the same to said cylinder, means for reciprocating said pistons, a ring secured to said cylinder over said ports and provided with an internal circular groove, arcuate slots in said ring leading to said groove, wire gauze coverings for said openings, and an oil-cup secured in said ring and communicating with said annular groove, substantially as described.

4. A tire pump comprising an air cylinder, spaced pistons provided in said cylinder and adapted to move in synchronism therein, a series of intake ports arranged centrally in said cylinder, peripheral notches and flexible packing means provided on said pistons, means for delivering air and preventing the return flow of the same to said cylinder, means for reciprocating said pistons comprising a piston rod, a sleeve on said piston rod having reversely disposed helical grooves formed therein terminating in common curved paths, an oscillatory dog traversing said grooves and paths, means for revolving said dog, a ring secured to said cylinder over said ports and provided with an internal groove, openings in said ring leading to said groove, and wire gauze coverings for said openings, substantially as described.

In testimony whereof I have signed my name to this specification in the presence of two subscribing witnesses.

FRANK E. CARLSON.

Witnesses:
FLORENCE E. LILLIS,
JOSHUA R. H. POTTS.